(12) United States Patent  (10) Patent No.: US 10,830,740 B2
Gebauer  (45) Date of Patent: Nov. 10, 2020

(54) PARALLEL SEPARATION SYSTEM

(75) Inventor: Klaus Gebauer, Uppsala (SE)

(73) Assignee: CYTIVA BIOPROCESS R&D AB, Uppsala (SE)

( * ) Notice: Subject to any disclaimer, the term of this patent is extended or adjusted under 35 U.S.C. 154(b) by 330 days.

(21) Appl. No.: 13/638,676

(22) PCT Filed: Mar. 30, 2011

(86) PCT No.: PCT/SE2011/050363
§ 371 (c)(1), (2), (4) Date: Oct. 1, 2012

(87) PCT Pub. No.: WO2011/123040
PCT Pub. Date: Oct. 6, 2011

(65) Prior Publication Data
US 2013/0020263 A1    Jan. 24, 2013

(30) Foreign Application Priority Data

Mar. 31, 2010    (SE) ...................................... 1050304

(51) Int. Cl.
*G01N 30/46* (2006.01)
*B01D 15/18* (2006.01)
(Continued)

(52) U.S. Cl.
CPC ....... *G01N 30/467* (2013.01); *B01D 15/1885* (2013.01); *G01N 30/78* (2013.01); *G01N 30/8665* (2013.01)

(58) Field of Classification Search
CPC  B01D 15/18; B01D 15/1864; B01D 15/1885; G01N 30/466; G01N 30/467
(Continued)

(56) References Cited

U.S. PATENT DOCUMENTS 5,048,349 A * 9/1991 Wolff .................... G01F 1/8468
73/861.357
6,360,579 B1 * 3/2002 De Boom ............. G01F 25/003
73/1.35

(Continued)

FOREIGN PATENT DOCUMENTS

EP    0 240 725    10/1987
EP    1 850 129    10/2007
(Continued)

OTHER PUBLICATIONS

GE.com, Chromatography residence time calculator. 2005.*
(Continued)

*Primary Examiner* — Krishnan S Menon
*Assistant Examiner* — Waqaas Ali
(74) *Attorney, Agent, or Firm* — Eversheds Sutherland (US) LLP

(57) ABSTRACT

A method in a separation system including parallel fluid paths each having a separation module, includes providing a sensor of the same type in at least each of the parallel fluid paths except one: measuring a characteristic fluid property with at least one of the sensors in the parallel fluid paths; possibly measuring the same characteristic fluid property with a system sensor positioned in the outlet of the separation system; and comparing measured characteristic fluid properties to evaluate and/or qualify the performance of the separation system.

6 Claims, 3 Drawing Sheets

(51) Int. Cl.
*G01N 30/78* (2006.01)
*G01N 30/86* (2006.01)

(58) Field of Classification Search
USPC .................. 210/635, 198.2, 142, 656, 85
See application file for complete search history.

(56) References Cited

U.S. PATENT DOCUMENTS

| | | | |
|---|---|---|---|
| 6,439,253 B1* | 8/2002 | Easton | H01L 21/67017 |
| | | | 137/486 |
| 6,743,356 B1* | 6/2004 | Fermier | G01N 30/32 |
| | | | 210/143 |
| 6,911,151 B1* | 6/2005 | Muller-Kuhrt et al. | 210/656 |
| 7,382,150 B2 | 6/2008 | Ohashi et al. | |
| 7,527,767 B2 | 5/2009 | Breimesser et al. | |
| 9,175,810 B2* | 11/2015 | Hains | G01F 25/0007 |
| 2001/0013494 A1 | 8/2001 | Maiefski et al. | |
| 2003/0087457 A1* | 5/2003 | Hughes | G01N 33/15 |
| | | | 436/175 |
| 2003/0150812 A1* | 8/2003 | Wainer | B01D 15/1885 |
| | | | 210/656 |
| 2006/0169640 A1* | 8/2006 | Quinn | G01N 30/06 |
| | | | 210/656 |
| 2007/0074766 A1 | 4/2007 | Klee et al. | |
| 2007/0131615 A1 | 6/2007 | Moran et al. | |
| 2008/0196511 A1* | 8/2008 | Ehring | G01F 1/662 |
| | | | 73/861.31 |
| 2009/0145851 A1* | 6/2009 | Witt | G01N 30/32 |
| | | | 210/741 |
| 2013/0179374 A1* | 7/2013 | Hains | G01F 7/00 |
| | | | 705/413 |

FOREIGN PATENT DOCUMENTS

| | | |
|---|---|---|
| WO | 1995026796 | 10/1995 |
| WO | 2000012199 | 3/2000 |
| WO | WO 2001/063270 | 8/2001 |
| WO | WO 2002/056006 | 7/2002 |
| WO | WO 2005/018770 | 3/2005 |

OTHER PUBLICATIONS

EP Search Report dated May 8, 2014 Issued on Corresponding EP Application No. 11763152.3.
CN Search Report dated Feb. 23, 2014 Issued on Corresponding CN Patent Application No. 201180018011.7.

* cited by examiner

PARALLEL SEPARATION SYSTEM

CROSS-REFERENCE TO RELATED APPLICATIONS

This application is a filing under 35 U.S.C. 371 of international application number PCT/SE2011/050363, filed Mar. 30, 2011, published on Oct. 6, 2011 as WO 2011/123040, which claims priority to application number 1050304-3 filed in Sweden on Mar. 31, 2010.

TECHNICAL FIELD OF THE INVENTION

The present invention relates to a method in a separation system comprising parallel fluid paths each comprising a separation module and to a separation system comprising a number of parallel fluid paths, wherein each parallel fluid path comprises a separation module.

BACKGROUND OF THE INVENTION

The use of separation modules, such as chromatography columns or cartridges, in a parallel configuration has a potential to reduce cost and increase flexibility in pilot and process scale bio-manufacturing. However, there are a number of problems associated with this concept. One of the problems is that the separation efficiency will decrease due to non-uniform flow over the individual modules in the parallel assembly.

SUMMARY

One object of the invention is to address the regulatory issues arising when running two or more separation modules in parallel.

This is achieved in a method according to claim 1 and in a system according to claim 6. Hereby both residence time and chromatographic efficiency can be measured over each individual module when run in parallel.

Another object of the invention it to provide a separation system in a parallel configuration that meets and exceeds the requirements of quality systems used in manufacture and testing of active pharmaceutical ingredients, diagnostics, foods, pharmaceutical products, and medical devices. Examples for such quality systems are "Good manufacturing practice" or "GMP" that outline the aspects of production and testing that can impact the quality of a product. A basic principle in GMP is for example that manufacturing processes need to be clearly defined and controlled. All critical processes need to be validated to ensure consistency and compliance with specifications. Further, records are to be made, manually or by instruments, during manufacture and these records shall enable the complete history of a batch to be traced are retained in a comprehensible and accessible form. GMP's are enforced by regulatory bodies, in the United States by the US FDA, for example under Section 501(B) of the 1938 Food, Drug, and Cosmetic Act (21USC351). The regulations use the phrase "current good manufacturing practices" (CGMP) to describe these guidelines.

Another object of the invention is to meet particularly the validation requirements that fall under GMP when using a separation system in a parallel configuration, such as process and cleaning validation.

Another object of the invention is to meet particularly the qualification requirements that fall under GMP when using a separation system in a parallel configuration, such as process and design qualification (DQ), component qualification (CQ), installation qualification (IQ), operational qualification (OQ), process qualification (PQ).

A further object of the invention is to meet particularly the documentation requirements that fall under GMP when using an automated separation system in a parallel configuration and especially to provide electronic data and records required to meet and exceed the validation and qualification requirements.

Further suitable embodiments of the invention are described in the dependent claims.

DETAILED DESCRIPTION OF THE EMBODIMENTS

Figure 1:
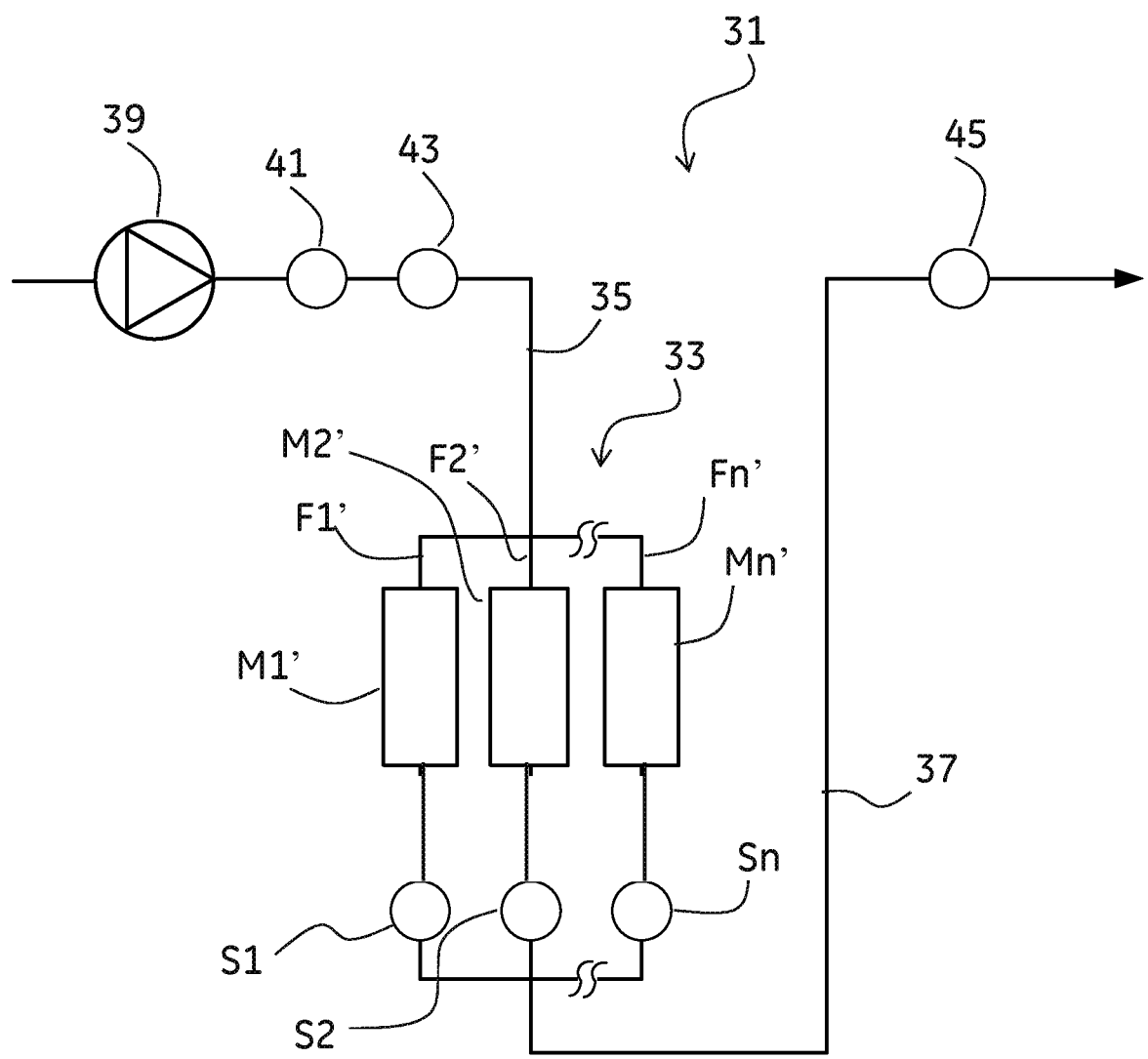
FIG. 1 shows schematically a separation system comprising a parallel assembly of separation modules according to one embodiment of the invention.

FIG. 1 shows schematically a separation system 31 comprising a parallel assembly 33 of separation modules M1', M2', ... Mn' according to one embodiment of the invention. The parallel assembly 33 comprises a number of parallel fluid paths F1', F2', ... Fn'. Three fluid paths are shown here but it could be any number of parallel fluid paths. Each fluid path F1', F2', Fn' comprises a separation module M1', M2', Mn'. The separation system 31 further comprises an inlet fluid path 35 entering the parallel assembly 33 and an outlet fluid path 37 leaving the parallel assembly 33. The inlet fluid path 35 comprises in this embodiment a pump 39, a flow meter 41 and a pressure sensor 43. According to the invention each fluid path F1', F2', ... Fn' also comprises a sensor S1, S2, ... Sn and the outlet fluid path 37 in the system 31 comprises at least one system sensor 45. Sensors S1 ... Sn are adapted to measure the residence time and/or chromatographic efficiency over each individual separation module M1', M2', ... Mn' when running the separation modules in parallel and at the same time these features can also be measured on a system level by means of the system sensor 45. Hereby the overall response on system level as measure by the system sensor 45 can be compared to the individual response of each separation module as measured by the sensors S1 ... Sn. In an alternative embodiment of the invention sensors S1, ... Sn are only provided in all the fluid paths except one. The sensor response from the last fluid path can still be calculated by using the response from the system sensor and subtracting the other sensor responses. Suitably, these sensors are disposable probes measuring a characteristic fluid property, where the characteristic fluid property is of type fluid flow rate, example concentration, force, pressure, temperature, conductivity, pH or the absorbance, reflectance or emission of light as for example the measurement of UV absorbance.

Figure 2:
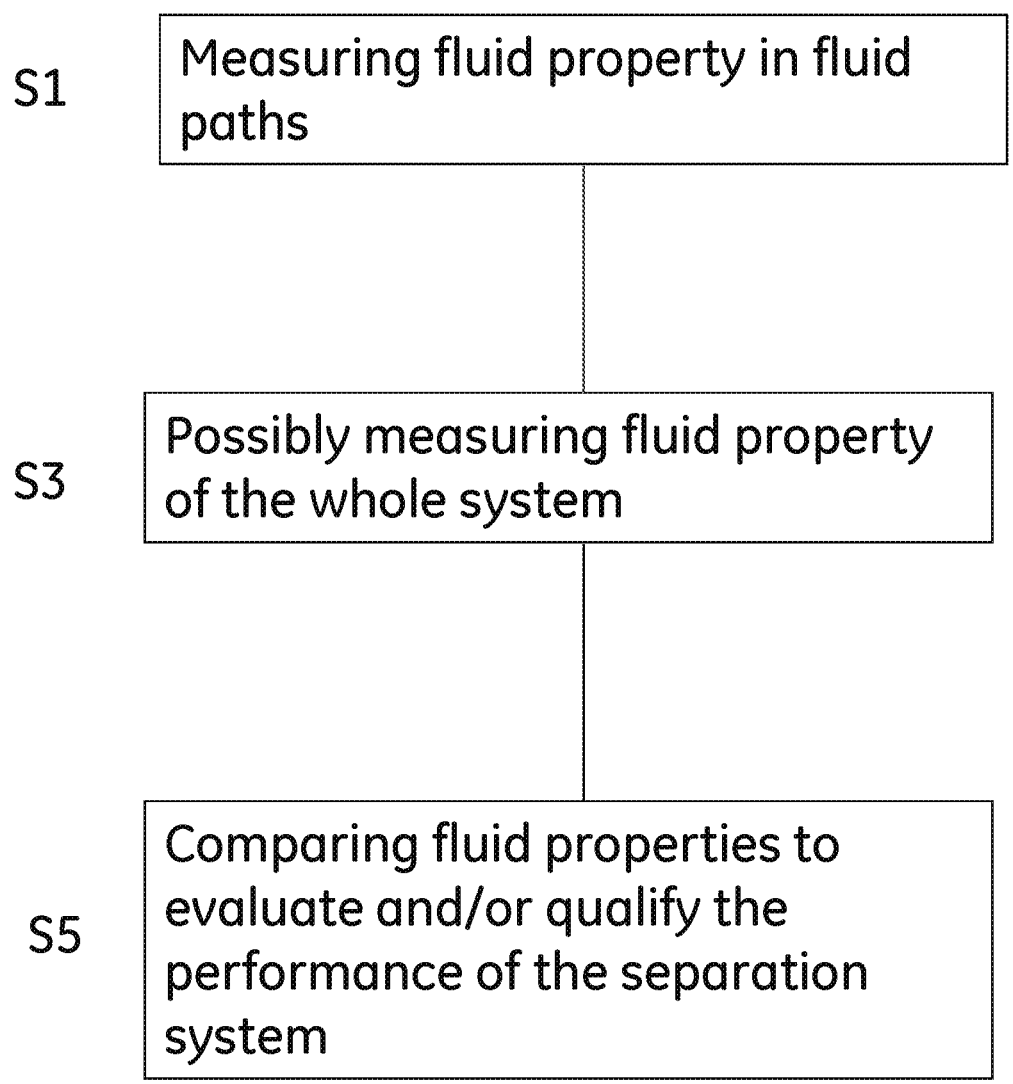
FIG. 2 is a flow chart of the method of the invention according to one embodiment of the invention.

FIG. 2 is a flow chart of the method of the invention according to one embodiment of the invention. The steps are described in order below:

S1: Measuring a characteristic fluid property with said sensors (S1, S2, ... Sn) in the parallel fluid paths. Alternatively, measuring a characteristic fluid property with n−1 of said sensors, measuring the characteristic fluid property on system level and calculating the characteristic fluid property in the last fluid path.

S3: Possibly measuring the same characteristic fluid property with the system sensor (45).

S5: Comparing measured characteristic fluid properties to evaluate and/or qualify the performance of the separation system.

The evaluation of the separation system can be the measurement of residence time and/or chromatographic efficiency. The characteristic fluid property can be of type fluid flow rate, concentration, conductivity or changes in the absorption, reflection or extinction of light or energy. The comparison of sensor responses is done for the purpose of qualifying, monitoring or documenting the performance of the system.

Figure 3:
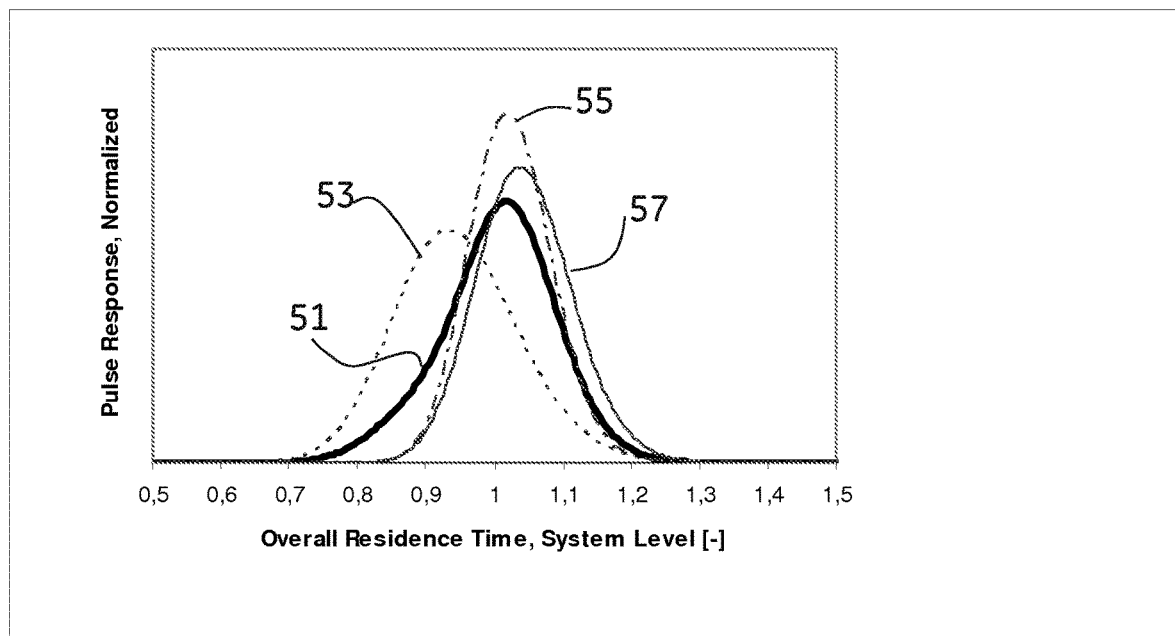
FIG. 3 shows a pulse response diagram for one example according to the embodiment shown in FIG. 1.

FIG. 3 shows a pulse response diagram for one example according to the embodiment shown in FIG. 1. In this example there are three fluid paths. F1', F2', F3' and thus three separation modules M1', M2', M3'. The curve denoted 51 shows the actual response on system level, i.e. measured by the system sensor 45. Here residence time is measured as the average residence time calculated by integration over the curve. In a simplified procedure, residence time may be deducted from the residence time at the maximum pulse response (maximum height of the peak).

The leading in the curve suggests that either one (or more) module(s) in the parallel system may deviate from the nominal response in terms of residence time or that at least one module may have a packed bed efficiency showing excessive leading. However, the overall response signal alone gives no detailed information about the status of the individual modules and the root cause for the leading in the curve. This information can only be provided by the signals form the individual modules. The curve denoted 53 shows the actual response as measured in the first sensor S1 in the first fluid path F1'. This is hereby the actual response from the first separation module M1' when run in parallel with the other separation modules M2', M3' of the system. The curve denoted 55 shows the actual response as measured in the second sensor S2 in the second fluid path F2'. This is hereby the actual response from the second separation module M2' when run in parallel with the other separation modules M1', M3' of the system. The curve denoted 57 shows the actual response as measured in the third sensor S3 in the third fluid path F3'. This is hereby the actual response from the third separation module M3' when run in parallel with the other separation modules M1', M2' of the system. For the example discussed here, all of the separation modules have residence time curves of symmetric shape, but one separation module, the first separation module M1', has a decreased average residence time. This reveals that the hydraulic resistance for this module is lower and the actual flow rate higher than for the other modules, respectively. As a result, the assessment of signals on the subsystem level gives full insight in the efficiency of the parallel assembly. Acceptance criteria for the performance of the individual separation modules as well as for the overall performance of the parallel assembly (as measured using sensor 45) can be set and monitored at installation of the parallel assembly as well as before and throughout a process. Three main parameters would be measured and evaluated for a parallel assembly of chromatography modules:

a) average residence time for each module in the parallel assembly compared to the average residence time in the response curve on system level b) chromatographic efficiency in terms of peak width (band broadening) for each module in the parallel assembly compared to the peak width for the response curve on system level, and c) peak symmetry for the response curve for each module in the parallel assembly compared to the symmetry in the response curve on system level.

In order to reduce complexity and cost of systems for purposes of control and measurement described in this invention, multiplexing techniques can be used. Muliplexing techniques allow the combined use of a common signal processing channel from or to the control system in order to sequentially access and modify the position of the control valves for example. Further, multiplexing techniques allow for the sequential or simultaneous reading of sensor information to a transmitter or control system, respectively. During the sequential adjustment of the hydraulic resistance of the fluid lines as described in this invention, the multiplexing principle is especially suitable for building a control system. With regard to the reading of sensor information as described for the performance monitoring of the separation modules, multiplexing enabled as the sequential and cyclic reading of discrete sensor signals is also applicable due to the rather slow changes in the pulse response signals that are to be monitored at column modules and system.

The invention claimed is:

1. A method in a separation system comprising the steps of:
providing:
(i) a plurality of parallel fluid paths, each fluid path comprising a separation module and a sensor;
wherein, each sensor is a disposable probe independently positioned within each parallel fluid path downstream of the respective separation module;
(ii) an inlet fluid path and an outlet fluid path, both being in fluidic connection to the separation modules;
(ii) a system sensor positioned in the outlet fluid path; and
(iv) a control system;
initiating operation of the separation modules simultaneously, and measuring a characteristic fluid property of each separation module via the sensors downstream of the separation modules while measuring the same characteristic fluid property of the combined parallel fluid paths via the system sensor;
comparing the measured characteristic fluid property measured by the system sensor to the characteristic fluid property measured by each sensor corresponding to the respective separation module, to evaluate performance of the separation system; and
sequentially adjusting the characteristic fluid property of the respective separation module based on the measured characteristic flow property measured by the system sensor, by sequentially accessing and modifying a position of an associated control valve, via the control system.

2. The method of claim 1, wherein the evaluation of the separation system comprises measurement of residence time or chromatographic efficiency.

3. The method of claim 1, further comprising comparing sensor response from at least one sensor in one of the parallel paths with the sensor response of the separation system sensor.

4. The method of claim 1, wherein the characteristic fluid property is one or more of type fluid flow rate, force, pressure, temperature, conductivity or pH.

5. The method of claim 1, wherein the comparison of sensor responses is done for the purpose of qualifying, monitoring or documenting the performance of the separation system.

6. The method of claim 1, wherein the characteristic fluid property is one or more of absorbance, reflectance, or emission of light.

* * * * *